July 7, 1959          D. G. MAGILL          2,893,295

METHOD OF PREPARING A CONTAINER FOR SHIPMENT AND SUBSEQUENT USE

Filed Oct. 24, 1955          2 Sheets—Sheet 1

INVENTOR.
DONALD G. MAGILL
BY Charles H. Erne
Leland R. McCann
George W. Reiber
ATTORNEYS July 7, 1959 D. G. MAGILL 2,893,295
METHOD OF PREPARING A CONTAINER FOR SHIPMENT AND SUBSEQUENT USE
Filed Oct. 24, 1955 2 Sheets-Sheet 2

INVENTOR.
DONALD G. MAGILL
BY
ATTORNEYS

United States Patent Office 2,893,295
Patented July 7, 1959

2,893,295

METHOD OF PREPARING A CONTAINER FOR SHIPMENT AND SUBSEQUENT USE

Donald G. Magill, Great Neck, N.Y., assignor to American Can Company, New York, N.Y., a corporation of New Jersey Application October 24, 1955, Serial No. 542,335

1 Claim. (Cl. 93—36)

The present invention relates to a fibre container for liquids, such as milk, fruit juices, and the like products and a method of preparing the same for shipment and subsequent use and has particular reference to such a container that can be collapsed and reformed and to a novel method of carrying out these steps.

Fibre containers for milk and fruit juices usually are prefabricated completely in manufacturing plants and shipped to dairies and other packers for filling. The shipment of such empty containers to and storage at the receiving plants requires considerable space and high freight and handling costs.

It is an object of the instant invention to overcome these difficulties by the provision of a container which may be readily collapsed after manufacture so as to occupy a minimum space for shipment and storage and which may be just as readily reformed into its original shape and size for use as a container for merchandising liquids such as milk, fruit juices and other products.

Another object is the provision of a method of collapsing and reforming such containers in a manner which preserves their original leakproof characteristics so that they safely carry liquid products.

Another object is the provision of such a method of collapsing and reforming containers of this nature without damage to the fibrous material of the container and any moisture-proofing or coating substance which may be provided on the container.

Numerous other objects and advantages of the invention will be apparent as it is better understood from the following description, which, taken in connection with the accompanying drawings, discloses a preferred embodiment thereof.

Referring to the drawings.

Figure 1:
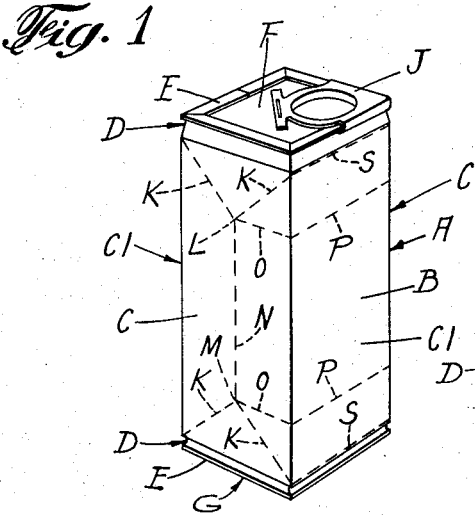
Figure 1 is a perspective view of a container embodying the instant invention.

As a preferred or exemplary embodiment of the instant invention Fig. 1 of the drawings discloses a fibre container A of the character shown in United States Patent 2,085,979, issued July 6, 1937 to J. M. Hothersall on Container, and designed for collapsing to facilitate economical shipment and storage and adapted to be subsequently reformed or reconstituted for filling with a liquid product such as milk, fruit juices and other products.

The container A comprises a rectangular tubular body B having a pair of opposed flat side walls C and a pair of connecting opposed flat side walls C1, the top and bottom marginal edge portions of which are necked-in at D and formed with immediately adjacent outwardly projecting ledges and overlapping flanges E, which form peripheral end seams for permanently securing to the ends of the body, flat top and bottom end closures or discs F, G as shown in the above mentioned Hothersall Patent 2,085,979. The top closure F preferably includes a filling and dispensing opening H (Fig. 9) and has a friction plug closure element J hingedly secured to it for sealing the opening.

In order to provide for collapsing and reforming of the container A, the two opposing side walls C are formed with diagonally disposed converging score or fold lines K (Fig. 1) which preferably are located in the outer faces of the walls. These diagonal score lines K extend inwardly from the corners of the top and bottom ends of the walls and define a pair of opposed triangles having spaced and oppositely disposed apices L, M. The two apices L, M are connected by a straight score or fold line N which extends longitudinally, i.e. vertically, in the outer faces of the two opposed side walls C.

In a similar manner the two opposing side walls C are further provided with score or fold lines O which originate at the apices L, M and extend laterally, on the same side of the longitudinal score line N, to the outer longitudinal edges of the opposing side walls C and connect with the ends of a pair of spaced and preferably parallel score or fold lines P formed in the outer face of the connecting side wall C1 as shown in Fig. 1. The outer face of this connecting side wall C1 is further provided with a pair of spaced and preferably parallel score or fold lines S, disposed one adjacent each of the necked-in portions D at the top and bottom ends of the side wall. These score lines S connect with the outer adjacent terminal ends of the diagonal score lines K in the side walls C.

Figure 2:
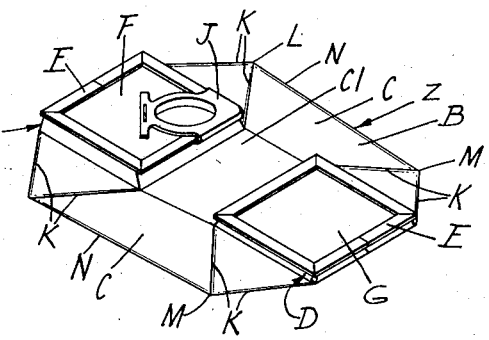
Fig. 2 is a perspective view of the container shown in Fig. 1 in a collapsed condition for shipment and storage.
Figure 4:
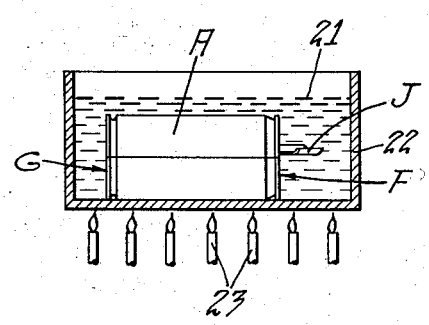
Figs. 4 and 5 are sectional views schematically illustrating steps of preparing the container shown in Fig. 1 for collapsing in accordance with the method of the instant invention.

With this system of interconnected score, fold or weakening lines the container A may be readily collapsed into a flat, space saving package or unit Z shown in Fig. 2, by a folding of the container side walls along the score lines. To effect this collapse of the container A, pressure is exerted against the opposed side walls C1 with the result that the opposed side walls C bulge outwardly and collapse or fold along the longitudinal score lines N. Simultaneously with this folding action and as a result of the pressure exerted against the side walls C1, the side walls C fold along the diagonal lines K and thus start a folding action which pivots the ends F, G of the container inwardly toward the side wall C1 containing the scores lines P, S. As this collapsing action progresses, the scored side walls C and side wall C1 fold along the score lines O, P and S to permit the ends F, G of the container to completely fold down on top of and in overlapping relation with, the completely collapsed side walls C, C1 thus completing the collapsing action and producing the flat container unit Z as shown in Fig. 2 which saves considerable space and cost in shipping, storage and other handling prior to use as a container for a merchandizable product.

Figure 3:
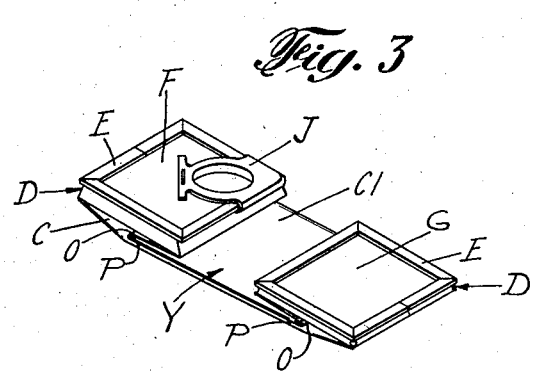
Fig. 3 is a perspective view of the container shown in Fig. 1 collapsed in a different or modified manner.

In a modified form of collapsing the container A, as shown in Fig. 3, a pressure is first exerted against the opposing side walls C to collapse these side walls inwardly and effect inward folding of the walls along the score lines N and K. With these side walls C thus folded or tucked under or between the opposed side walls C1, the container is folded along the score lines O, P and S to collapse the top and bottom ends F, G into position overlapping the folded side walls C, C and overlapped side walls C1, C1 as shown in Fig. 3. This manner of collapsing the container results in a package or container unit Y of narrower width but slightly greater in thickness as compared with the unit Z disclosed in Fig. 2.

In order to protect the fibrous material of the containers when they are used for liquid products, all exposed surfaces of the containers, preferably are coated with a film of moistureproof and waterproof substance such as paraffine or wax blend or a plastic substance such as Saran (vinylidene-chloride polymer) or other suitable substance.

As a preferred or exemplary method of preparing such tubular fibre containers for storage and subsequent use, Fig. 4 to 9 inclusive of the drawings schematically illustrate the method steps embodied in the instant invention. In such a method, protection is given to the coating substance on the surface of the container and to the fibrous structure of the material from which the container is made so as to insure against strain or damage to either of these elements and to thereby prevent leakage of the collapsed and reconstituted containers.

Figure 5:
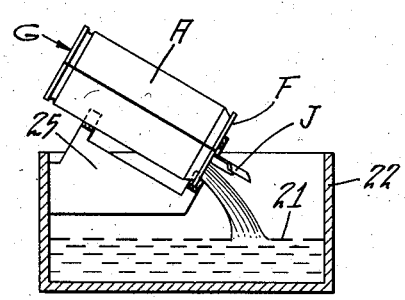
Figure 8:
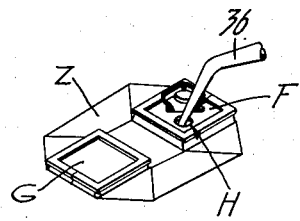
Figs. 7 and 8 are perspective views illustrating steps of the method incidental to reforming the containers for use.
Figure 6:
Fig. 6 is a sectional view of the collapsed containers stacked and packed for shipment and storage.

As the first step in this method, the uncollapsed original, scored containers A are coated with a protective film as hereinbefore mentioned. For this purpose the container A preferably is immersed in any suitable manner in a bath of heated liquid paraffin or wax blend 21 (Fig. 4) disposed in a reservoir 22 which is heated in any suitable manner, as by gas burners 23 to maintain the paraffin or wax blend 21 in a molten or liquid condition. The friction plug closure J is open during this operation to permit the paraffin to enter the interior of the container. After immersion in the wax bath, the container A is removed and allowed to drain itself of all surplus wax so as to leave a thin uniform coating on all exterior and interior surfaces of the container. One way of effecting this draining as shown in Fig. 5 is to place the container, in an angular inverted position with its plug closure J open, in a rack 25 secured to the reservoir 22 so that the excess paraffin will drain back into the reservoir.

Following the draining step, the containers are collapsed into the flat units Z or Y respectively shown in Fig. 2 and Fig. 3 by folding them along the score lines K, N, O, P, S as explained above. This collapsing of the containers preferably is effected while they are still warm, i.e. at a temperature ranging between 3 to 5 degrees below the melting point of the wax so that the wax is still soft and pliable to insure against damage by breaking or cracking of the wax and the fibres of the container material along the score lines where the bending of the container walls takes place. The collapsed containers are then permitted to cool at room temperature until the wax film on their inner and outer surfaces is hard.

In their collapsed and cooled condition the container units Z or Y are ready for stacking or packing into boxes 27 (Fig. 6) for shipment to and storage at a dairy for subsequent filling with a product and merchandizing use or for storage and ready handling in other plants until subsequent use is required.

Figure 9:
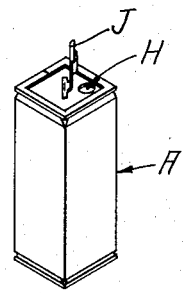
Fig. 9 is a perspective view of the fully reformed container.

For filling with a product and use as a merchandizing container, the collapsed container units Z or Y are reformed or reconstituted into their original container form as shown in Figs. 1 and 9. For this purpose the collapsed container units preferably are first heated to a temperature ranging between 3 to 5 degrees below the melting point of the wax in the protective film on their inner and outer surfaces to soften the wax and thereby insure against rupture of the protective film and the fibres of the container material, along the score lines when the walls of the containers are flexed back into their original positions.

Figure 7:
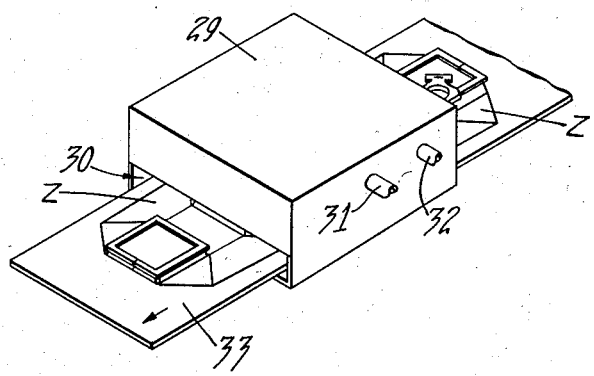

The heating of the container units may be effected in any suitable manner, as for example, by passing them through a heating chamber 30 enclosed by a housing 29 as shown in Fig. 7. The proper temperature may be maintained within the chamber by an electric heating element in the housing 29 or by circulating through the housing a fluid heating medium such as steam, hot water or oil or other medium introduced into the housing by way of an inlet pipe 31 and discharged through an outlet pipe 32. An endless belt conveyor 33 extending through the heating chamber 30 may be provided to pass the collapsed container units through the chamber at the proper speed.

While the collapsed container units are still warm and the wax contained thereon is in a soft and pliable condition, the walls C, C1, and top and bottom ends F, G are unfolded to reconstitute the containers. This is preferably effected by blowing a blast of warm air into the collapsed container units through their filling and dispensing openings H. One way of effecting this step is by way of a nozzle 36 (Fig. 8) which is insertable into the container openings H and which is connected to a hose leading from a suitable source of warm compressed air. If desired, the blast of warm air may carry with it a fine mist of hot, liquified wax which is projected or sprayed against the inner surfaces of the containers to repair any possible damage done to the score lines during the aforesaid bending of the walls of the containers.

This blast of air injected into the containers inflates them and thus causes the folded side walls C, C1 and top and bottom ends F, G to snap outwardly back into their original positions and thus reconstitutes the containers in their original form, ready for filling with a product and shipment to the consumer.

Where a suitable plastic, such as Saran, is used as a protective film on the containers instead of paraffin or a wax blend, the heating steps of the method may be omitted. Such containers may be immediately collapsed as explained above without the use of heat and for subsequent reconstitution may be blown back into shape as explained above, by means of the hot air and wax mist. The air effectively snaps the walls and ends of the containers back into their original positions and the wax mist supplements the original interior protective coating with a film of wax which repairs any possible damage done to the inner surfaces of the containers through bending of the walls along the score or fold lines.

Thus empty containers may be readily collapsed to occupy a minimum space which saves considerable on freight and handling costs and space in storage plants so that packers may avail themselves of a sufficiently large supply of containers to satisfy their immediate and emergency needs in a minimum space.

It is thought that the invention and many of its attendant advantages will be understood from the foregoing description, and it will be apparent that various changes may be made in the form, construction and arrangement of the parts and that changes may be made in the steps of the method described and their order of accomplishment without departing from the spirit and scope of the invention or sacrificing all of its material advantages, the form hereinbefore described being merely a preferred embodiment thereof.

I claim:

The method of preparing for storage and subsequent use, empty rectangular fibre containers having opposed rigid flat side walls and rigid flat connecting side walls all provided with scored fold lines, and having rigid flat top and bottom ends devoid of scored fold lines with a filling and dispensing opening of restricted size in the top end thereof, said method comprising the steps of compressing together two opposing side walls of said containers to overlap such side walls and to bend the remaining connected side walls along certain of said fold lines, and simultaneously bending the rigid top and bottom ends of said containers along certain other of said fold lines and inwardly against and overlapping said compressed overlapped side walls to collapse the containers into substantially flat units for stacking and handling, and thereafter restoring said collapsed container units to their original shape by injecting a gaseous medium under pressure into said restricted openings to expand and reform said containers for filling with a liquid, and simultaneously injecting with said gaseous medium, a mist of liquefied coating material and depositing the same on the inner wall surfaces of the containers to repair possible damage to said scored fold lines as a result of the aforesaid bending of the container walls therealong to collapse the containers.

References Cited in the file of this patent

UNITED STATES PATENTS

| | | |
|---|---|---|
| 393,899 | Haines | Dec. 4, 1888 |
| 1,600,320 | Danquigney | Sept. 21, 1926 |
| 1,886,376 | Dambacher | Nov. 8, 1932 |
| 2,377,533 | Waters | June 5, 1945 |
| 2,555,315 | Carroll | June 5, 1951 |
| 2,673,023 | Vander Lugt | Mar. 23, 1954 |
| 2,687,247 | Chidsey | Aug. 24, 1954 |
| 2,757,848 | Elam | Aug. 7, 1956 |
| 2,768,493 | Holler | Oct. 30, 1956 |